(12) United States Patent
Johnson

(10) Patent No.: US 8,302,842 B2
(45) Date of Patent: Nov. 6, 2012

(54) METHOD OF CREATING A HONEYCOMB CORE USING A SERPENTINE WELDING PATH

(75) Inventor: Jeffrey D. Johnson, Wichita, KS (US)

(73) Assignee: Benecor, Inc., Wichita, KS (US)

( * ) Notice: Subject to any disclaimer, the term of this patent is extended or adjusted under 35 U.S.C. 154(b) by 222 days.

(21) Appl. No.: 12/560,815

(22) Filed: Sep. 16, 2009

(65) Prior Publication Data

US 2011/0062221 A1    Mar. 17, 2011

(51) Int. Cl.
*B23K 31/02*    (2006.01)
(52) U.S. Cl. ......................................... 228/181; 228/157
(58) Field of Classification Search .................. 228/181, 228/157
See application file for complete search history.

(56) References Cited

U.S. PATENT DOCUMENTS

| | | | |
|---|---|---|---|
| 5,324,913 A | 6/1994 | Oberg et al. | |
| 5,437,936 A | 8/1995 | Johnson | |
| 5,609,288 A | 3/1997 | Johnson | |
| 5,823,417 A | 10/1998 | Johnson | |
| 6,568,582 B2 * | 5/2003 | Colligan | 228/112.1 |
| 6,599,609 B2 | 7/2003 | Johnson | |
| 6,871,725 B2 | 3/2005 | Johnson | |
| 2006/0255098 A1 * | 11/2006 | Runyan | 228/112.1 |

* cited by examiner

*Primary Examiner* — Nicholas D'Aniello
(74) *Attorney, Agent, or Firm* — Spencer Fane Britt & Browne LLP

(57) ABSTRACT

A honeycomb core is created from a stack of metal sheets that are welded together using a serpentine weld path. Each sheet in the stack is welded to the sheet underneath. All the odd-numbered sheets, excluding the bottom sheet, are welded using a first serpentine welding pattern that includes a plurality of long welds and a plurality of short welds. All the even-numbered sheets are welded using a second serpentine welding pattern that includes a plurality of long welds and a plurality of short welds, such that the long welds of the second serpentine welding pattern are shifted from the long welds of the first serpentine welding pattern. When a sufficient number of sheets have been welded, the stack is trimmed to remove the short welds. The stack is expanded by pulling the sheets one from another to form the honeycomb core.

11 Claims, 7 Drawing Sheets

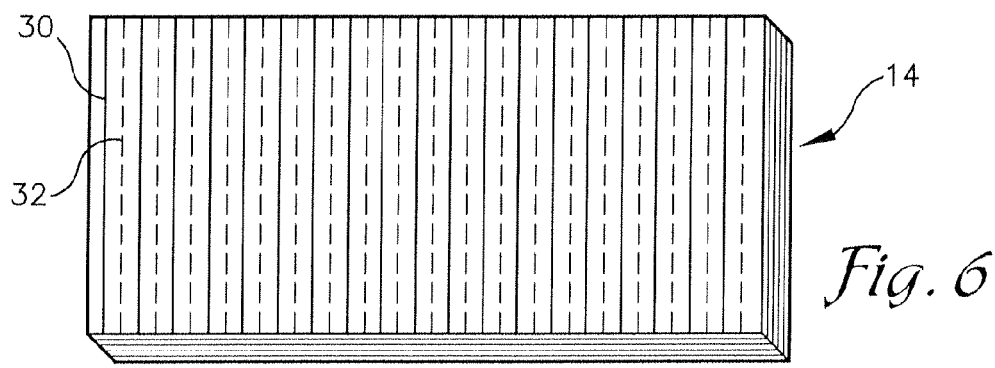
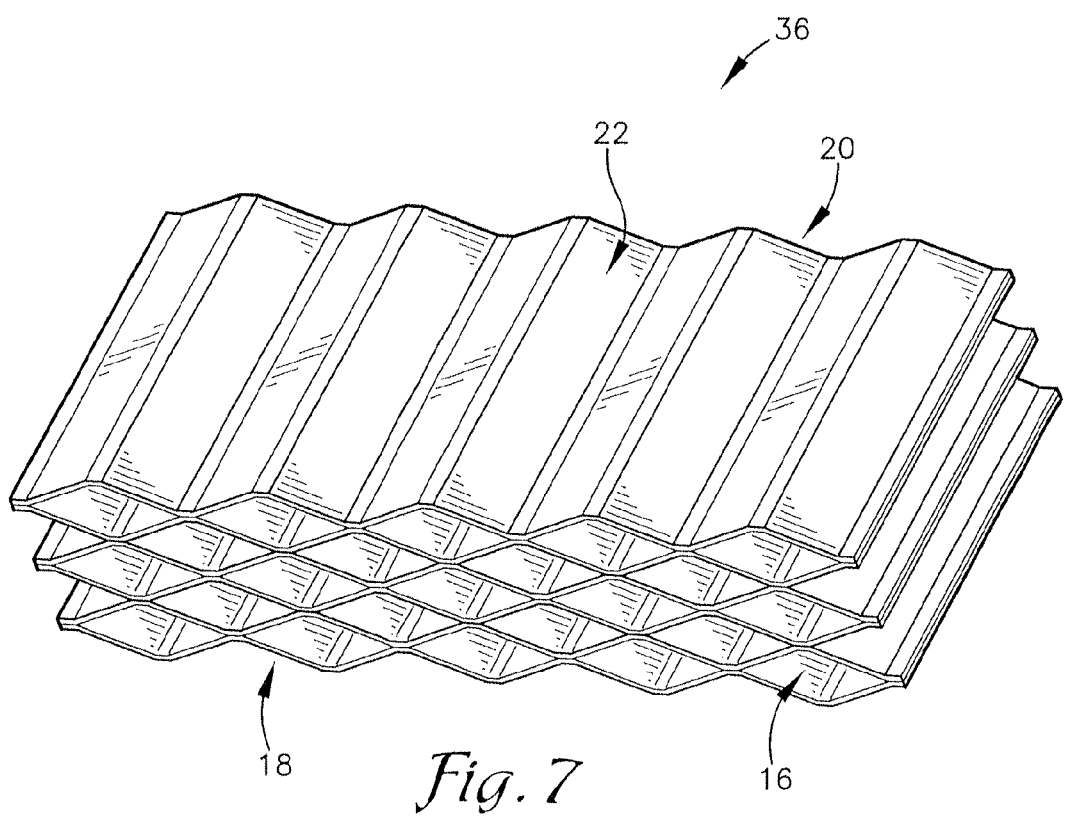

METHOD OF CREATING A HONEYCOMB CORE USING A SERPENTINE WELDING PATH

BACKGROUND OF THE INVENTION

1. Field of the Invention

Embodiments of the present invention relate to honeycomb cores. More particularly, embodiments of the present invention relate to methods for creating honeycomb cores by welding a plurality of metal sheets together using a serpentine welding path.

2. Description of the Related Art

A honeycomb core is a structure formed from a plurality of cells that are joined together, wherein each cell may be open-ended with a plurality of walls that surround empty space. The honeycomb core is typically sandwiched between other materials to generally provide lightweight support strength over an area. Honeycomb cores may also be used for acoustic damping, energy absorption, and airflow direction. Honeycomb cores may be utilized in the aerospace, aircraft, automotive, marine, and railcar industries, among others.

One approach to creating honeycomb cores is to create a stack of sheets, where each sheet is bonded to the sheet beneath it, and the stack is expanded after bonding to form the core. In some cases, the sheet material may be non-metallic and the sheets may be bonded together with adhesive or epoxy. In other cases, the sheets may be made of metal foil and bonded together by welding. Each sheet may be welded to the sheet below with a plurality of parallel linear weld paths. Each weld path may cause a slight shrinkage in the foil along the weld path, which in turn may cause the foil to curl on the sides of the weld path. The curling may lead to an uneven welding surface and curvature of the stack of sheets near the edges. The curvature increases as the size of the stack grows. Depending on the design requirements, hundreds of metal sheets may be stacked and welded to create the honeycomb core. Since the integrity of the weld and the quality of the core may depend on the flatness of the welding surface, either the size of the core may be limited or flattening techniques may need to be applied.

When the curvature of the stack becomes excessive, a flattening process may be applied, wherein the stack may be removed from the welding station and placed in a vacuum furnace where it is weighted down and heated to flatten the curvature of the stack. Afterwards, more sheets may be welded to the stack until the curvature again becomes excessive and the flattening process is repeated. Correcting the curvature of the stack adds time and expense to the production of the honeycomb core.

An angled honeycomb core may have a face at an angle between zero degrees and ninety degrees with respect to the longitudinal axis of each cell. The angled honeycomb core may be used in thermal airflow applications where directional heat removal is required. One approach to creating an angled honeycomb core is to build a stack of bonded sheets, as described above. But before expanding the stack, the sides of the stack that form the faces of the core are cut at a wedge-shaped angle, corresponding to the desired angle of the core cells, and that portion of the stack is removed. Since the sides of the stack that form the faces are usually along the largest dimension of each sheet, cutting and removing the stack along the face sides wastes a large amount of core material.

SUMMARY OF THE INVENTION

Embodiments of the present invention solve the above-mentioned problems and provide a distinct advance in the art of manufacturing honeycomb cores. More particularly, embodiments of the invention provide a method of creating a honeycomb core that includes the use of a serpentine welding pattern to reduce the curvature of a stack of welded metal sheets.

Various embodiments of the present invention include a method for creating a honeycomb core comprising the steps of placing a first sheet on top of a second sheet to create a stack and welding the first sheet to the second sheet using a first serpentine welding pattern that includes a plurality of long welds and a plurality of generally orthogonal short welds. The method further includes welding a third sheet to the top of the stack using a second serpentine welding pattern that includes a plurality of long welds and a plurality of generally orthogonal short welds, such that the long welds of the second serpentine welding pattern are shifted from the long welds of the first serpentine welding pattern.

Additional sheets may be welded to the top of the stack, wherein odd-numbered sheets are welded using the first serpentine welding pattern and even-numbered sheets are welded using the second serpentine welding pattern. The method also includes trimming opposing sides of the stack to remove the short welds of the first serpentine welding pattern and the second serpentine welding pattern as well as expanding the stack by pulling the sheets one from another to form the honeycomb core.

Other embodiments of the current invention include a method for creating an angled honeycomb core that utilizes a serpentine welding pattern which avoids having to trim a stack of sheets that forms the core along the larger dimension of the stack. At least a portion of the steps of the method may include placing a first metal sheet on top of a second metal sheet to create a stack and welding the first metal sheet to the second metal sheet using a first angled serpentine welding pattern that includes a plurality of long welds and a plurality of short welds, wherein the angle between the long welds and the short welds is a first angle between ninety degrees and zero degrees. The method further includes welding a third metal sheet to the top of the stack using a second angled serpentine welding pattern that includes a plurality of long welds and a plurality of short welds, wherein the angle between the long welds and the short welds is the first angle and such that the long welds of the second angled serpentine welding pattern are shifted from the long welds of the first angled serpentine welding pattern and a portion of each short weld of the second angled serpentine welding pattern overlaps a portion of each short weld of the first angled serpentine welding pattern.

Additional sheets may be welded to the top of the stack, wherein odd-numbered sheets are welded using the first angled serpentine welding pattern and even-numbered sheets are welded using the second angled serpentine welding pattern. The method also includes trimming opposing sides of the stack to remove the short welds of the first angled serpentine welding pattern and the second angled serpentine welding pattern, as well as trimming opposing sides of the stack parallel to the long welds of the first angled serpentine welding pattern and the second angled serpentine welding pattern. The method additionally includes expanding the stack by pulling the metal sheets one from another to form the honeycomb core.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 6 is a top view of the stack of sheets after the short welds have been removed;

FIG. 7 is a perspective view of an angled honeycomb core;

Figure 9:
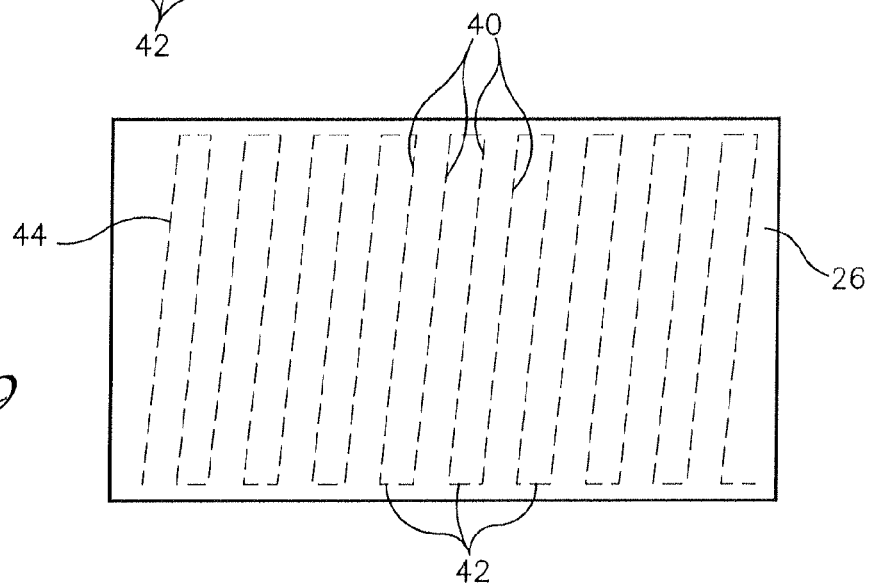
Figure 10:
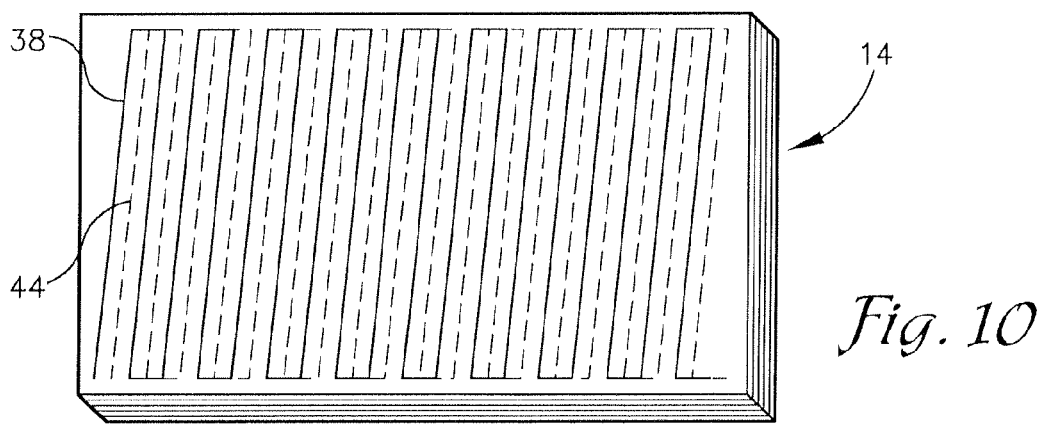
Figure 11:
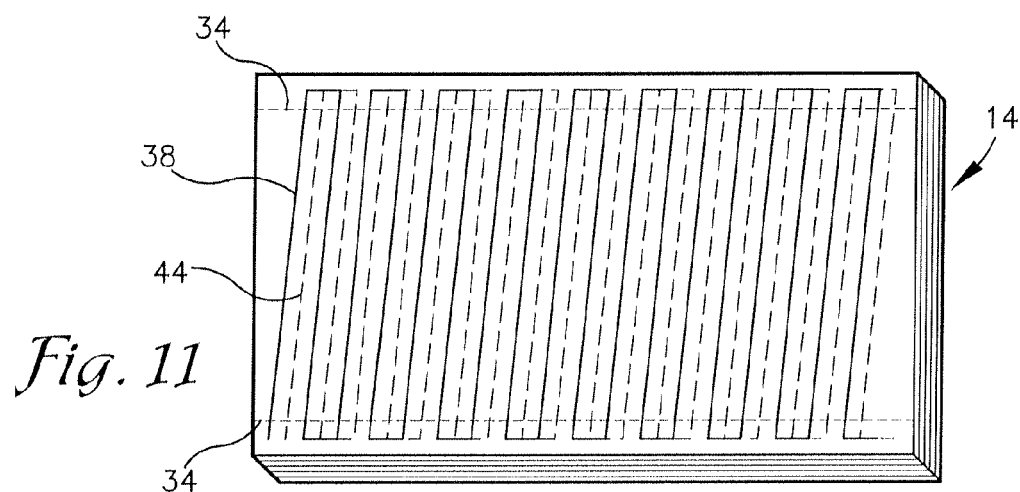
Figure 12:
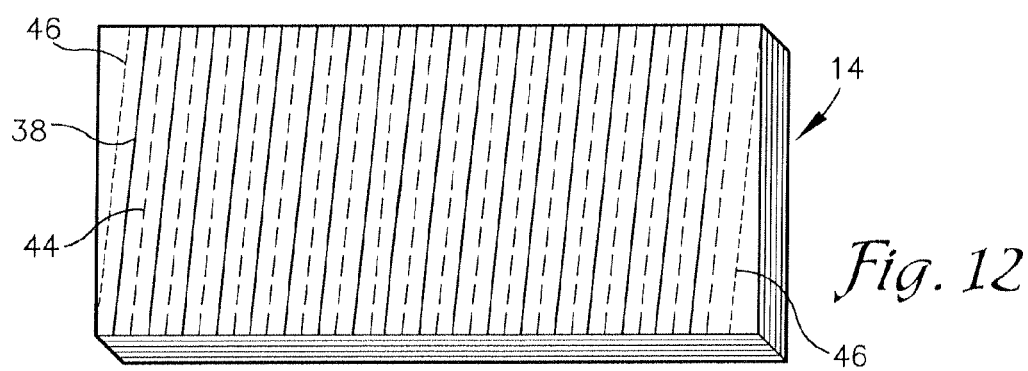
Figure 13:
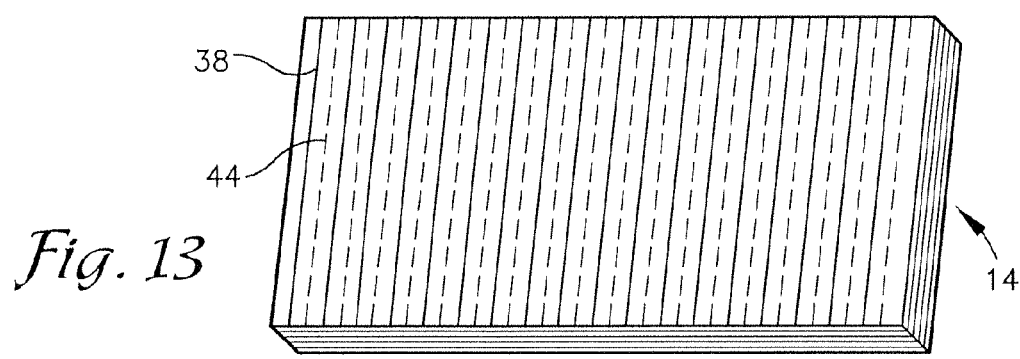
Figure 14:
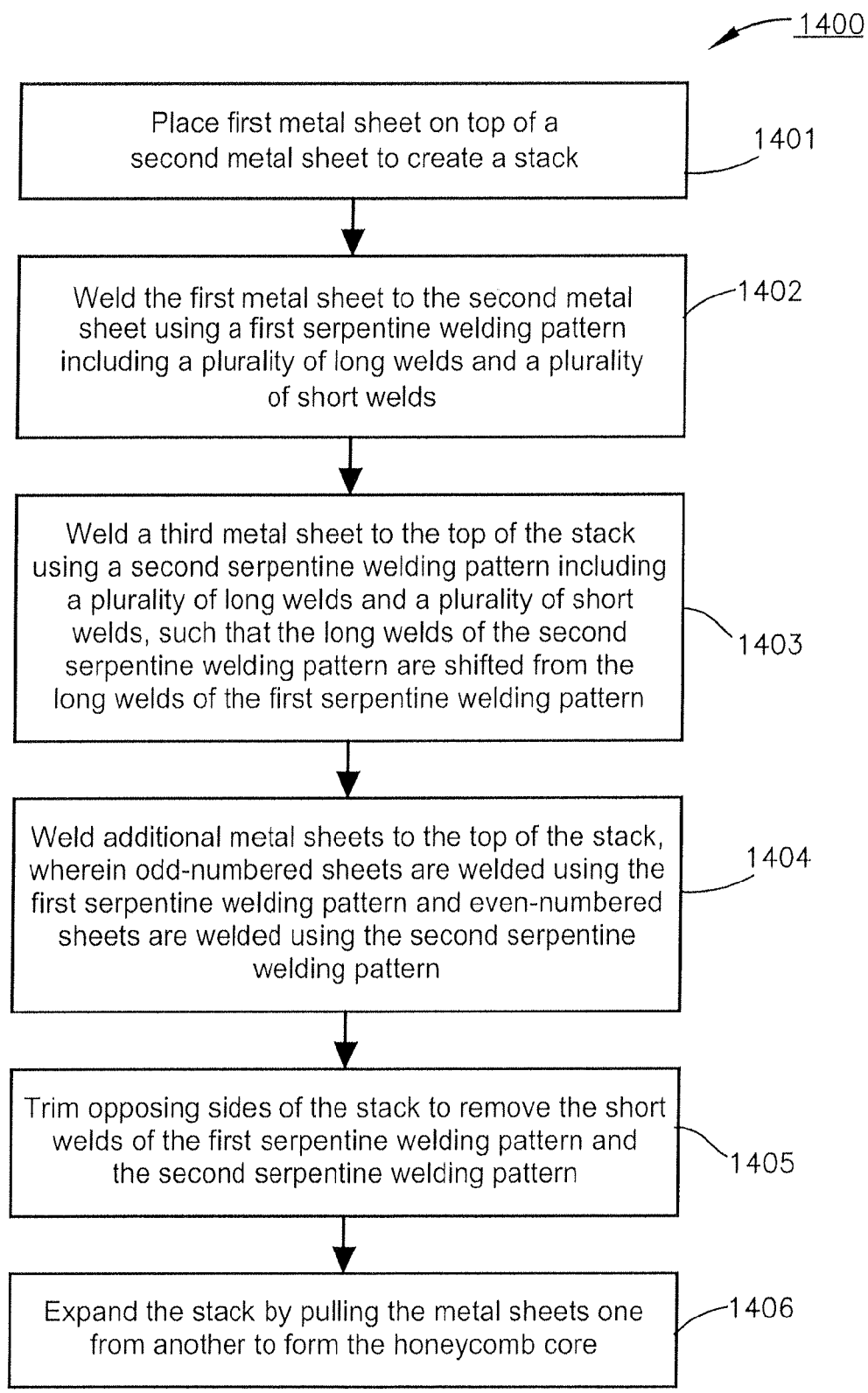
Figure 15:
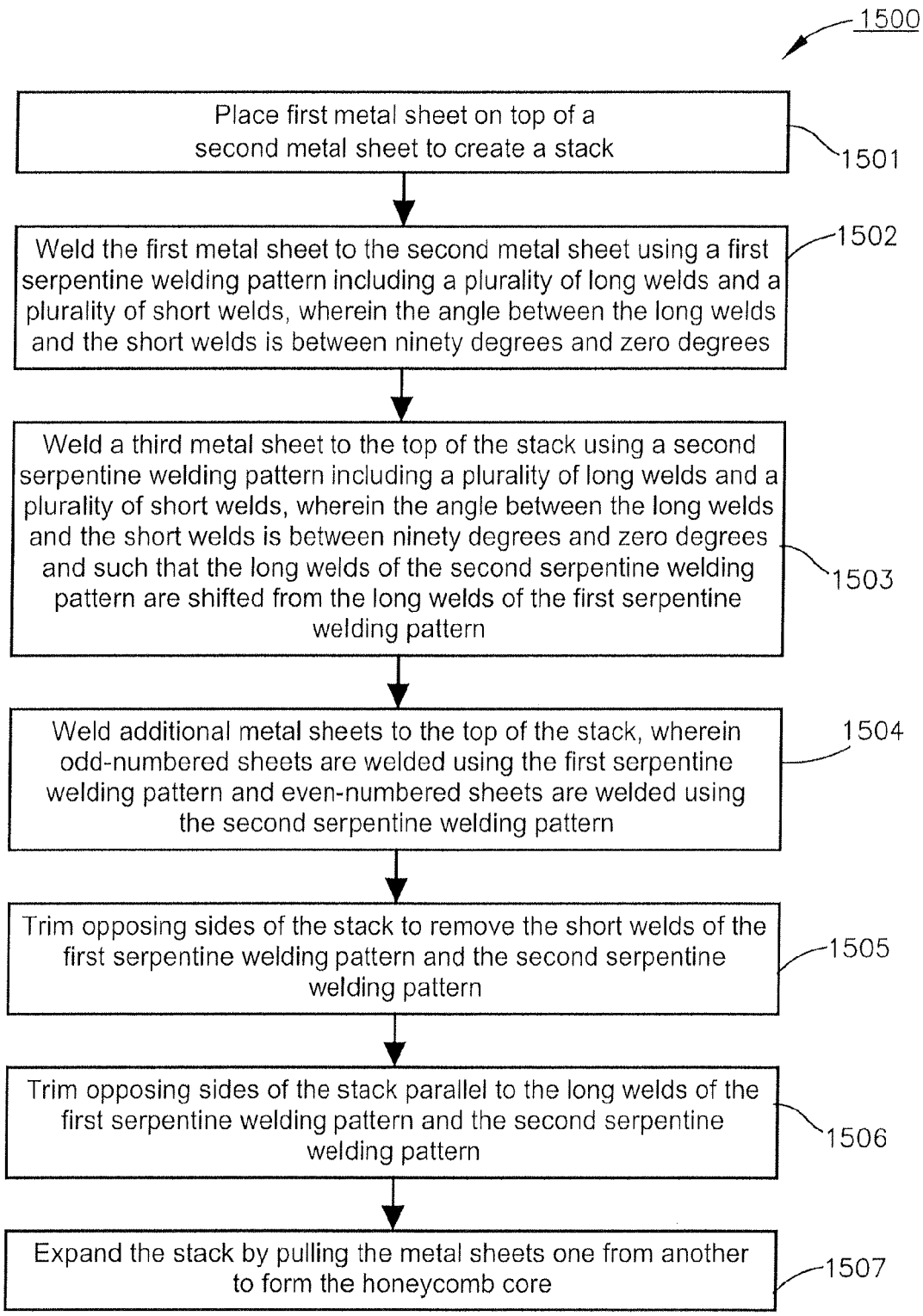

FIG. 9 is a top view of an odd-numbered sheet used to form the angled honeycomb core that illustrates a second serpentine welding pattern that includes a plurality of long welds and a plurality of short welds, wherein the angle between the long welds and the short welds is the first angle and the long welds of the second serpentine welding pattern are shifted from the long welds of the first serpentine welding;

FIG. 10 is a top view of the odd-numbered sheet and the even-numbered sheet stacked one on top of the other illustrating the shift between the first serpentine welding pattern and the second serpentine welding pattern;

FIG. 11 is a top view of the stack of sheets illustrating first trim lines that show where to cut the stack of sheets to remove the short welds of the first serpentine welding pattern and the second serpentine welding pattern;

FIG. 12 is a top view of the stack of sheets illustrating second trim lines that show where to cut the stack of sheets parallel to the long welds of the first serpentine welding pattern and the second serpentine welding pattern;

FIG. 13 is a top view of the stack of sheets after the short welds and the material parallel to the long welds have been removed;

FIG. 14 is a flow diagram of at least some of the steps of a method of creating the honeycomb core; and FIG. 15 is a flow diagram of at least some of the steps of a method of creating the angled honeycomb core.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
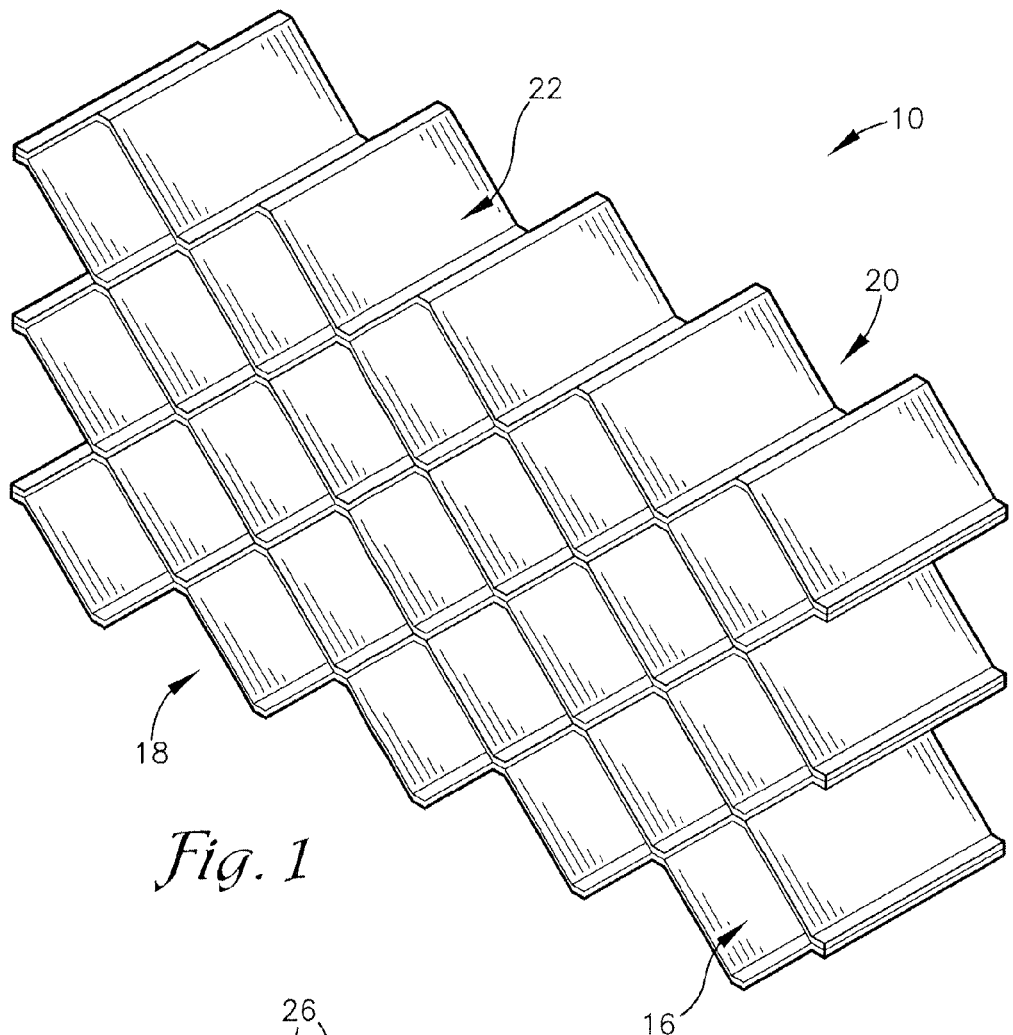
FIG. 1 is a perspective view of an exemplary honeycomb core created utilizing methods in accordance with various embodiments of the current invention.

A honeycomb core 10, manufactured utilizing a method in accordance with various embodiments of the current invention, is shown in FIG. 1. The core 10 may be formed from a plurality of sheets 12 that are bonded together in a stack 14 and then expanded. Once expanded, as shown in FIG. 1, the core 10 may include a plurality of open-ended cells 16 with a front face 18, a rear face 20, and a plurality of angled surfaces 22 in a regular pattern therebetween, wherein each of the surfaces 22 is formed from one of the sheets 12. The finished core 10 may be varied in size, depending on the dimensions of each sheet 12 and the number of sheets 12 included. A typical core 10 and stack 14 may have a length of approximately 6 feet, a width of approximately 1 foot, and the number of sheets 12 necessary to achieve the desired dimensions once the honeycomb core 10 is expanded. The core 10 may also be cut, trimmed, or otherwise modified to achieve nearly any dimensions desirable.

The sheet 12 may generally be a metal foil, wherein the metal used may be aluminum, carbon steels, stainless steels, nickel based alloys, cobalt based alloys, titanium alloys, niobium alloys, copper, brass, or the like. The dimensions of the sheet 12 may vary, although a rectangular shape is generally utilized, with one dimension being greater than the other. In the example above, the dimensions of each sheet 12 may be approximately 6 feet by approximately 1 foot.

The stack 14 may be created by placing one sheet 12 on top of another sheet 12 repeatedly until the desired height is reached, bearing in mind that the stack 14 is expanded to create the core 10. Each sheet 12 may be bonded to the sheet 12 beneath. When using metal foil as the sheet material, each sheet 12 may be bonded to the sheet 12 beneath by welding, typically by laser welding.

Figure 2:
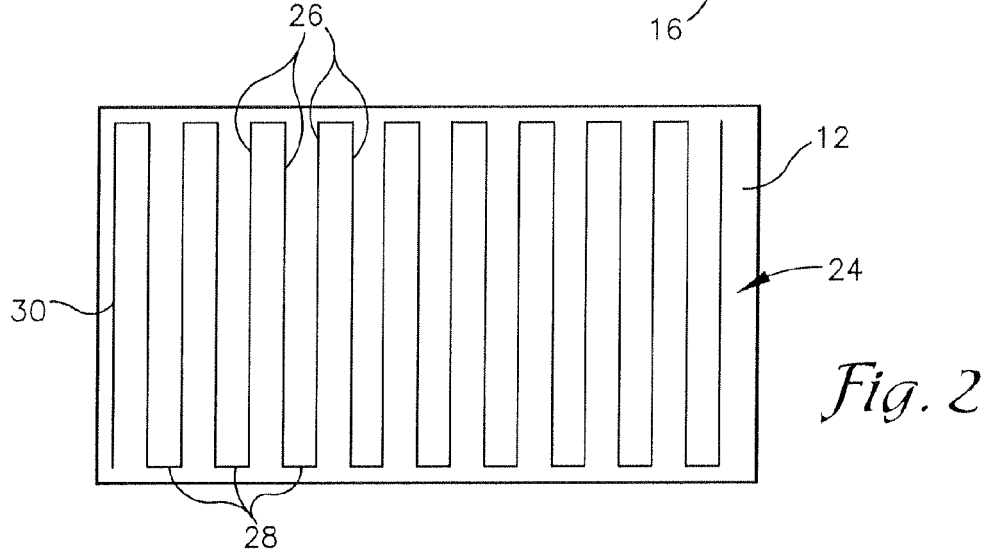
FIG. 2 is a top view of an odd-numbered sheet used to form the honeycomb core that illustrates a first serpentine welding pattern that includes a plurality of long welds and a plurality of short welds.

Each sheet 12 may be welded to sheet 12 beneath by utilizing a serpentine welding pattern 24 as shown in FIG. 2. The serpentine welding pattern 24 may be periodic in nature and may include a plurality of long welds 26 and a plurality of short welds 28, such that the long welds 26 and the short welds 28 are generally orthogonal to one another. The long welds 26 may be substantially parallel to one another. Each short weld 28 may couple the end of one long weld 26 to the beginning of the next long weld 26. Thus, the short welds 28 may not actually face one another, but rather may alternate at opposing ends of the long welds 26. The long welds 26 may be aligned with or substantially parallel to the sides of the shorter dimension of the sheet 12, while the short welds 28 may be aligned with or substantially parallel to the sides of the longer dimension of the sheet 12.

Figure 3:
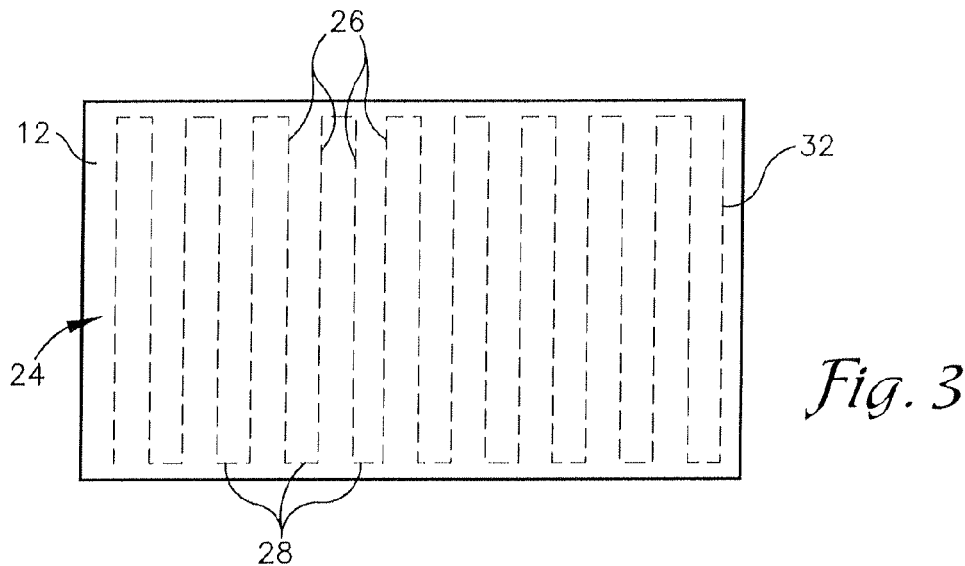
FIG. 3 is a top view of an even-numbered sheet used to form the honeycomb core that illustrates a second serpentine welding pattern that includes a plurality of long welds and a plurality of short welds, wherein the long welds of the second serpentine welding pattern are shifted from the long welds of the first serpentine welding pattern.
Figure 4:
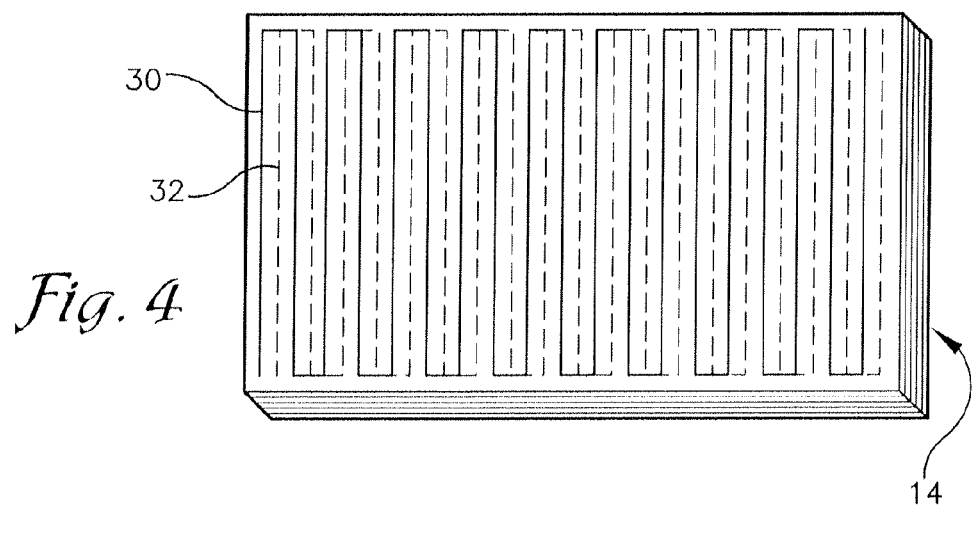
FIG. 4 is a top view of the odd-numbered sheet and the even-numbered sheet stacked one on top of the other illustrating the shift between the first serpentine welding pattern and the second serpentine welding pattern.

For the first sheet 12 on top of the stack 14, the serpentine welding pattern 24 may be a first serpentine welding pattern 30, as shown in FIG. 2. For the second sheet 12 added to the stack 14, the serpentine welding pattern 24 may be a second serpentine welding pattern 32, as shown in FIG. 3. The second serpentine welding pattern 32 may include a plurality of long welds 26 and a plurality of short welds 28, as discussed above. However, the long welds 26 of the second serpentine welding pattern 32 may be shifted from the long welds 26 of the first serpentine welding pattern 30 and a portion of each short weld 28 of the second serpentine welding pattern 32 may overlap a portion of each short weld 28 of the first serpentine welding pattern 30. Typically, the long welds 26 of the second serpentine welding pattern 32 may be positioned approximately midway between the long welds 26 of the first serpentine welding pattern 30, as seen in FIG. 4. Thus, the second serpentine welding pattern 32 may be positioned 90° out of phase with the first serpentine welding pattern 30.

Additional sheets 12 may be added to the stack 14. Odd-numbered sheets 12 may be welded using the first serpentine welding pattern 30 while even-numbered sheets 12 may be welded using the second serpentine welding pattern 32.

Figure 5:
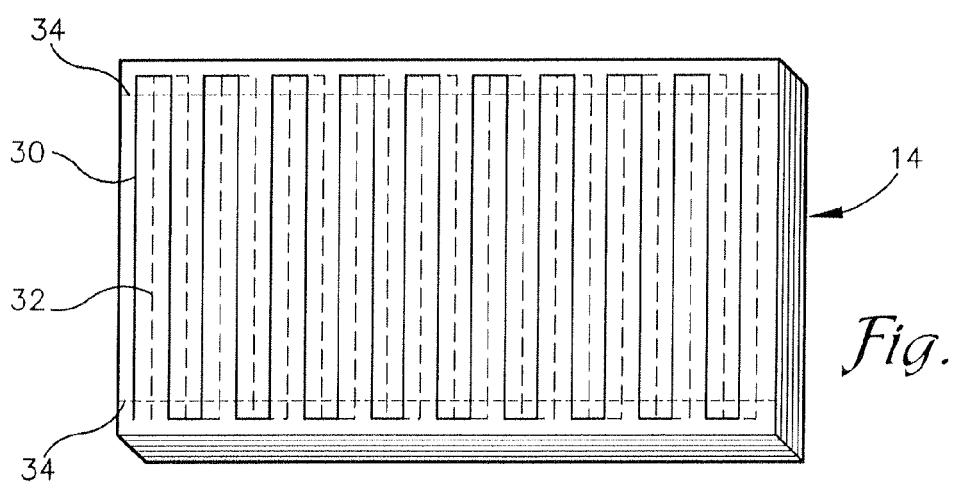
FIG. 5 is a top view of the stack of sheets illustrating trim lines that show where to cut the stack of sheets to remove the short welds of the first serpentine welding pattern and the second serpentine welding pattern.

Once a sufficient number of sheets 12 have been welded to the stack 14 to meet design requirements, the stack 14 may be trimmed. The short welds 28 generally prevent expansion of the stack 14 and thus may be removed. A first pair of trim lines 34, as shown in FIG. 5, indicate where the stack 14 may be trimmed. The lines 34 may be generally parallel to the short welds 28 of the first serpentine welding pattern 30 and the second serpentine welding pattern 32 and spaced away from the short welds 28 toward the center of the stack 14 to accommodate the needs of the trimming equipment without removing an excessive amount of the stack 14. The stack 14 may be trimmed by various trimming or cutting equipment, such as wire EDM, waterjet, or band saw.

Once the short welds 28 are removed, as shown in FIG. 6, the stack 14 may be expanded to form the core 10, as shown in FIG. 1. The stack 14 may be expanded through tensional forces that generally pull one sheet 12 from another. Various techniques may include inserting pins, such as nails, into the open edges of the stack 14 and then pulling on the pins to expand the core 10.

An angled honeycomb core 36, as shown in FIG. 7, is generally similar to the honeycomb core 10 of FIG. 1 and described above. However, the longitudinal axis of the body 22 may be positioned at an angle θ, seen in FIG. 8, between 0° and 90° with respect to the front face 18 and the rear face 20. The angled honeycomb core 36 may also be formed in a similar fashion as the honeycomb core 10 described above, with the following exceptions.

Figure 8:
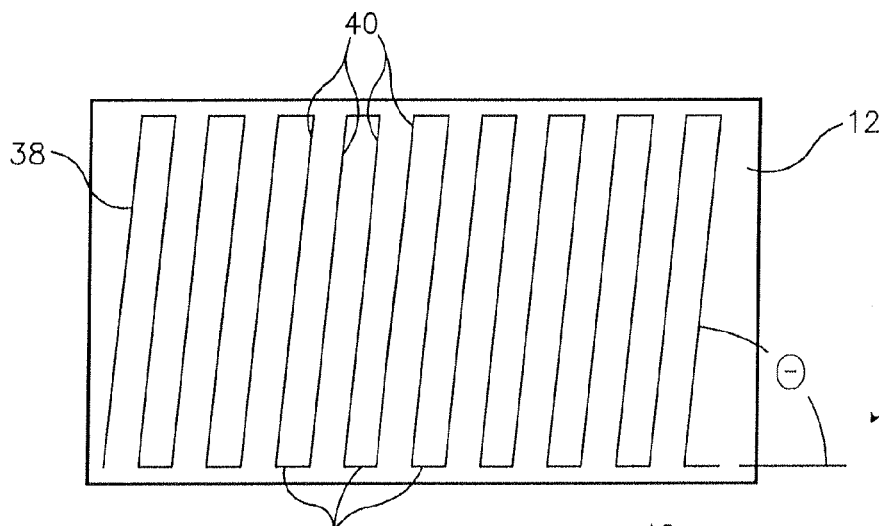
FIG. 8 is a top view of an odd-numbered sheet used to form the angled honeycomb core that illustrates a first serpentine welding pattern that includes a plurality of long welds and a plurality of short welds, wherein the angle between the long welds and the short welds is a first angle between ninety degrees and zero degrees.

The first sheet 12 on the stack 14 may be welded to the sheet 12 beneath with a first angled serpentine welding pattern 38 that includes a plurality of long welds 40 and a plurality of short welds 42, as shown in FIG. 8. As discussed above, each short weld 42 may couple the end of one long weld 40 to the beginning of the next long weld 40, and the short welds 42 may be aligned with or substantially parallel to the sides of the longer dimension of the sheet 12. Furthermore, the long welds 40 may be substantially parallel to one another. However, in contrast to the honeycomb core 10, the long welds 40 may be positioned at the angle θ with respect to the short welds 42.

The second sheet 12 on the stack 14 may be welded to the sheet 12 beneath utilizing a second angled serpentine welding pattern 44, which includes a plurality of long welds 40 and a plurality of short welds 42, as shown in FIG. 9. As with the first angled serpentine welding pattern 38, each short weld 42 may couple the end of one long weld 40 to the beginning of the next long weld 40, with the long welds 40 being substantially parallel to one another. In addition, the long welds 40 may be positioned at the angle θ with respect to the short welds 42. Furthermore, as with the honeycomb core 10 discussed above, the long welds 40 of the second angled serpentine welding pattern 44 may be shifted from the long welds 40 of the first angled serpentine welding pattern 38 and a portion of each short weld 42 of the second angled serpentine welding pattern 44 may overlap a portion of each short weld 42 of the first angled serpentine welding pattern 38. Typically, the long welds 40 of the second angled serpentine welding pattern 44 may be positioned approximately midway between the long welds 40 of the first angled serpentine welding pattern 38, as seen in FIG. 10. Thus, the second angled serpentine welding pattern 44 may be positioned 90° out of phase with the first angled serpentine welding pattern 38.

Additional sheets 12 may be added to the stack 14. Odd-numbered sheets 12 may be welded using the first angled serpentine welding pattern 38 while even-numbered sheets 12 may be welded using the second angled serpentine welding pattern 44.

Once a sufficient number of sheets 12 have been welded to the stack 14 to meet design requirements, the stack 14 may be trimmed. The short welds 42 generally prevent expansion of the stack 14 and thus may be removed. The first pair of trim lines 34, as shown in FIG. 11, indicate where the stack 14 may be trimmed. The lines 34 may be generally parallel to the short welds 42 and spaced away from the short welds 42 toward the center of the stack 14 to accommodate the needs of the trimming equipment without removing an excessive amount of the stack 14. In addition, excess sheet 12 material may be removed on the sides of the stack 14 of the shorter dimension. The stack 14 may be trimmed along a second pair of trim lines 46, as shown in FIG. 12, that are parallel to the long welds 40.

As discussed above with the honeycomb core 10, once the short welds 42 and the excess sheet 12 material are removed, as shown in FIG. 13, the stack 14 may be expanded to form the angled honeycomb core 36.

At least a portion of the steps of a method 1400 to create a honeycomb core 10 in accordance with various embodiments of the present invention is listed in FIG. 14. Some steps may be performed concurrently instead of sequentially, as shown. Additionally, some steps may be performed in a different order from what is shown in FIG. 14.

In connection with step 1401, a first metal sheet 12 is placed on top of a second metal sheet 12 to create a stack 14. In connection with step 1402, the first metal sheet 12 is welded to the second metal sheet 12 using a first serpentine welding pattern 30 that includes a plurality of long welds 26 and a plurality of short welds 28, as shown in FIG. 2. The long welds 26 may be generally orthogonal to the short welds 28 and generally parallel to one another. Each short weld 28 may couple the end of one long weld 26 to the beginning of the next long weld 26.

In connection with step 1403, a third metal sheet 12 is welded to the top of the stack 14 using a second serpentine welding pattern 32 that includes a plurality of long welds 26 and a plurality of orthogonal short welds 28, as shown in FIG. 3, such that the long welds 26 of the second serpentine welding pattern 32 are shifted from the long welds 26 of the first serpentine welding pattern 30. In addition, a portion of each short weld 28 of the second serpentine welding pattern 32 may overlap a portion of each short weld 28 of the first serpentine welding pattern 30. The long welds 26 of the second serpentine welding pattern 32 may be positioned approximately midway between the long welds 26 of the first serpentine welding pattern 30, as shown in FIG. 4.

In connection with step 1404, additional metal sheets 12 are welded to the top of the stack 14, wherein odd-numbered sheets 12 are welded using the first serpentine welding pattern 30 and even-numbered sheets 12 are welded using the second serpentine welding pattern 32.

In connection with step 1405, opposing sides of the stack 14 are trimmed to remove the short welds 28 of the first serpentine welding pattern 30 and the second serpentine welding pattern 32. The stack 14 may be trimmed along a line that is a short distance from the short welds 28 toward the center of the stack 14, as shown in FIG. 5. In connection with step 1406, the stack 14 may be expanded by pulling the metal sheets 12 one from another to form the honeycomb core 10.

At least a portion of the steps of a method 1500 to create an angled honeycomb core 36 in accordance with various embodiments of the present invention is listed in FIG. 15. Some steps may be performed concurrently instead of sequentially, as shown. Additionally, some steps may be performed in reverse order from what is shown in FIG. 15.

In connection with step 1501, a first metal sheet 12 is placed on top of a second metal sheet 12 to create a stack 14. In connection with step 1502, the first metal sheet 12 is welded to the second metal sheet 12 using a first angled serpentine welding pattern 38 that includes a plurality of long welds 40 and a plurality of short welds 42, wherein the angle between the long welds 40 and the short welds 42 is an angle θ between ninety degrees and zero degrees, as shown in FIG. 8. The long welds 40 may be generally parallel to one another. Each short weld 42 may couple the end of one long weld 40 to the beginning of the next long weld 40.

In connection with step 1503, a third sheet 12 is welded to the top of the stack 14 using a second angled serpentine welding pattern 44 that includes a plurality of long welds 40 and a plurality of short welds 42, as shown in FIG. 9, wherein the angle between the long welds 40 and the short welds 42 is the angle θ and such that the long welds 40 of the second angled serpentine welding pattern 44 are shifted from the long welds 40 of the first angled serpentine welding pattern 38. In addition, a portion of each short weld 42 of the second angled serpentine welding pattern 44 may overlap a portion of each short weld 42 of the first angled serpentine welding pattern 38. The long welds 40 of the second angled serpentine welding pattern 44 may be positioned approximately midway between the long welds 40 of the first angled serpentine welding pattern 38, as shown in FIG. 10.

In connection with step 1504, additional metal sheets 12 are welded to the top of the stack 14, wherein odd-numbered sheets 12 are welded using the first angled serpentine welding pattern 38 and even-numbered sheets 12 are welded using the second angled serpentine welding pattern 44.

In connection with step 1505, opposing sides of the stack 14 are trimmed to remove the short welds 42 of the first angled serpentine welding pattern 38 and the second angled serpentine welding pattern 44. The stack 14 may be trimmed along a line that is a short distance from the short welds 42 toward the center of the stack 14, as shown in FIG. 11. In connection with step 1506, opposing sides of the stack 14 are trimmed parallel to the long welds 40 of the first angled serpentine welding pattern 38 and the second angled serpentine welding pattern 44 in order to remove excess sheet 12 material. In connection with step 1507, the stack 14 may be expanded by pulling the metal sheets 12 one from another to form the angled honeycomb core 36.

Although the invention has been described with reference to the embodiments illustrated in the attached drawing figures, it is noted that equivalents may be employed and substitutions made herein without departing from the scope of the invention as recited in the claims.

The invention claimed is:

1. A method of creating a honeycomb core, the method comprising the steps of:
   a) placing a first sheet on top of a second sheet to create a stack;
   b) welding the first sheet to the second sheet using a first serpentine welding pattern that includes welding a long weld followed by welding a generally orthogonal short weld in a repeated parallel sequence;
   c) welding a third sheet to the top of the stack using a second serpentine welding pattern that includes welding a long weld followed by welding a generally orthogonal short weld in a repeated parallel sequence, such that the long welds of the second serpentine welding pattern are shifted from the long welds of the first serpentine welding pattern; and
   d) trimming opposing sides of the stack to remove the short welds of the first serpentine welding pattern and the second serpentine welding pattern.

2. The method of claim 1, further including the step to be performed before step d) of welding additional sheets to the top of the stack, wherein odd-numbered sheets are welded using the first serpentine welding pattern and even-numbered sheets are welded using the second serpentine welding pattern.

3. The method of claim 1, further including the step of expanding the stack by pulling the sheets one from another to form the honeycomb core.

4. The method of claim 1, wherein the long welds of the second serpentine welding pattern are positioned midway between the long welds of the first serpentine welding pattern.

5. The method of claim 1, wherein a portion of each short weld of the second serpentine welding pattern overlaps a portion of each short weld of the first serpentine welding pattern.

6. The method of claim 1, wherein for the first serpentine welding pattern and the second serpentine welding pattern, one long weld is connected to the next long weld by one short weld.

7. A method of creating a honeycomb core, the method comprising the steps of:
   a) placing a first metal sheet on top of a second metal sheet to create a stack;
   b) welding the first metal sheet to the second metal sheet using a first serpentine welding pattern that includes welding a long weld followed by welding a generally orthogonal short weld in a repeated parallel sequence;
   c) welding a third metal sheet to the top of the stack using a second serpentine welding pattern that includes welding a long weld followed by welding a generally orthogonal short weld in a repeated parallel sequence, such that the long welds of the second serpentine welding pattern are shifted from the long welds of the first serpentine welding pattern and a portion of each short weld of the second serpentine welding pattern overlaps a portion of each short weld of the first serpentine welding pattern;
   d) welding additional metal sheets to the top of the stack, wherein odd-numbered sheets are welded using the first serpentine welding pattern and even-numbered sheets are welded using the second serpentine welding pattern;
   e) trimming opposing sides of the stack to remove the short welds of the first serpentine welding pattern and the second serpentine welding pattern; and
   f) expanding the stack by pulling the metal sheets one from another to form the honeycomb core.

8. The method of claim 7, wherein for the first serpentine welding pattern and the second serpentine welding pattern, one long weld is connected to the next long weld by one short weld.

9. The method of claim 7, wherein the long welds of the second serpentine welding pattern are positioned midway between the long welds of the first serpentine welding pattern.

10. The method of claim 1, wherein the first serpentine pattern and the second serpentine pattern are each created with one continuous weld.

11. The method of claim 7, wherein the first serpentine pattern and the second serpentine pattern are each created with one continuous weld.

* * * * *